Jan. 14, 1958 A. B. VIETH 2,819,805
BATTERY COMPONENT ASSEMBLING MACHINES
Filed Oct. 5, 1953 3 Sheets-Sheet 1

INVENTOR
Albert B. Vieth
BY
ATTORNEY

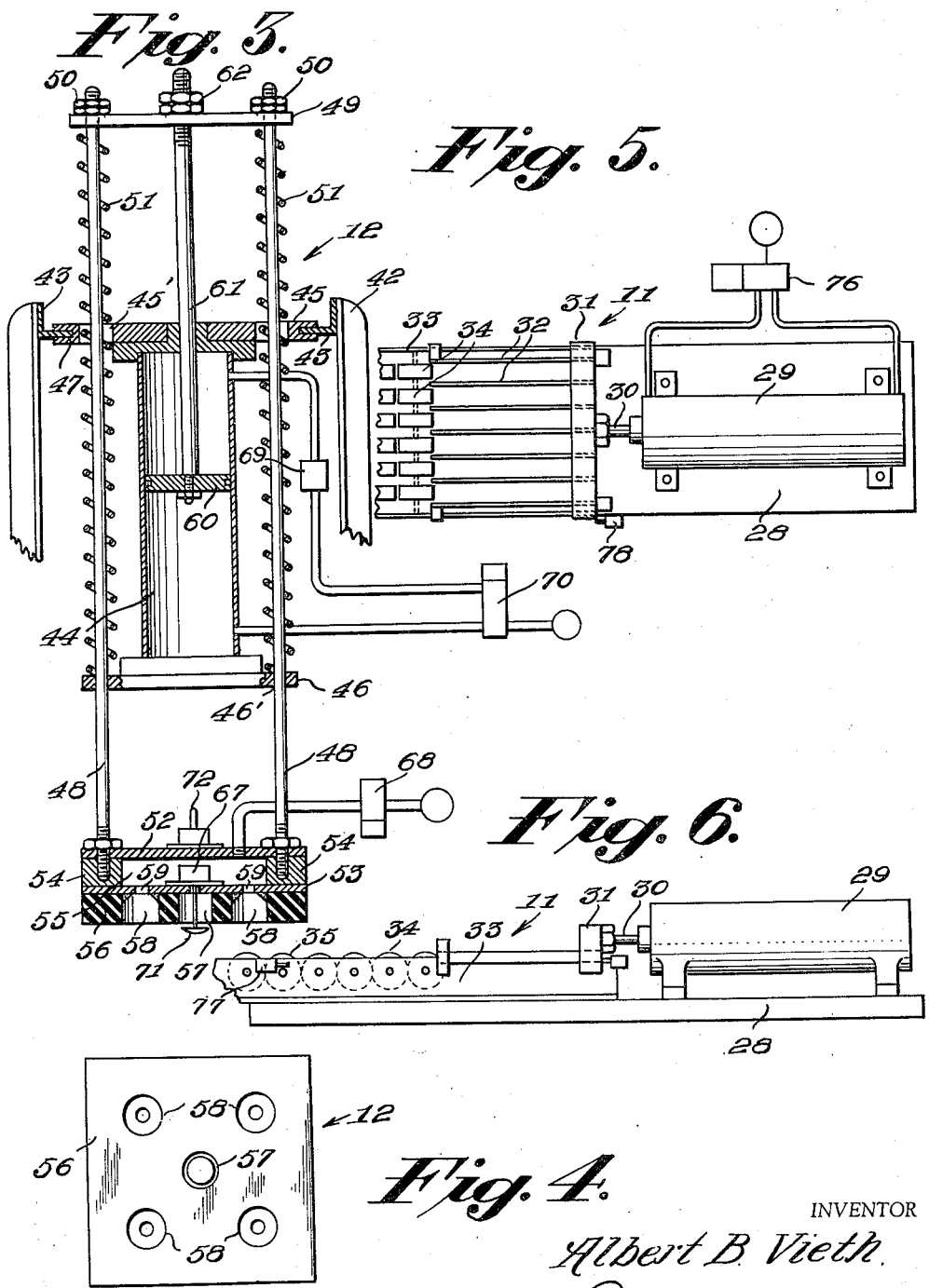

Jan. 14, 1958     A. B. VIETH     2,819,805
BATTERY COMPONENT ASSEMBLING MACHINES
Filed Oct. 5, 1953     3 Sheets-Sheet 3
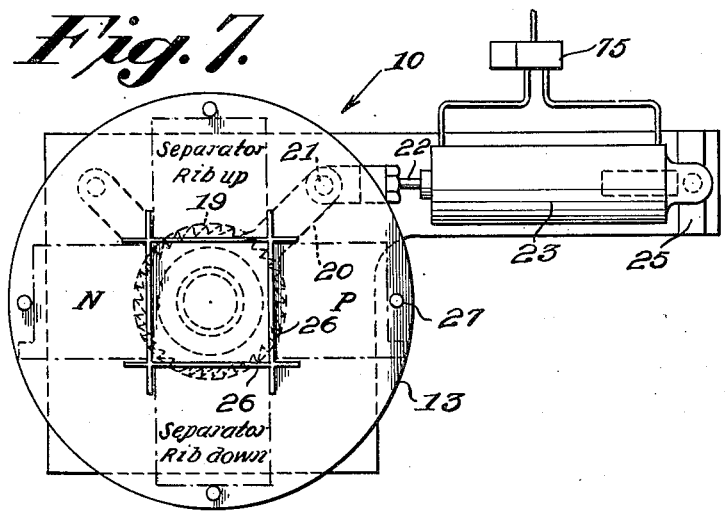
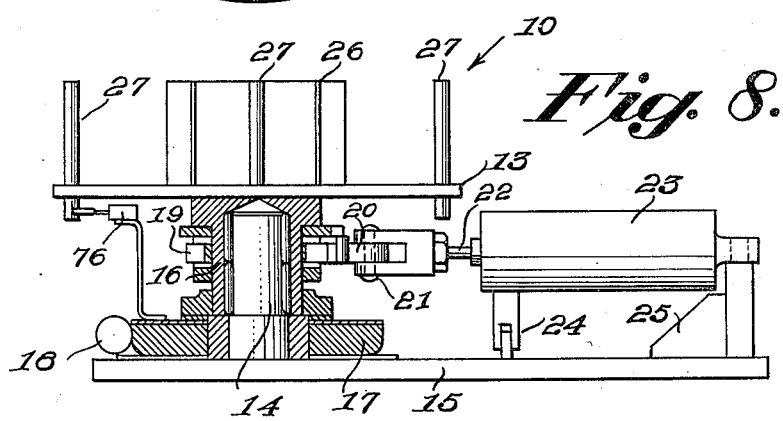
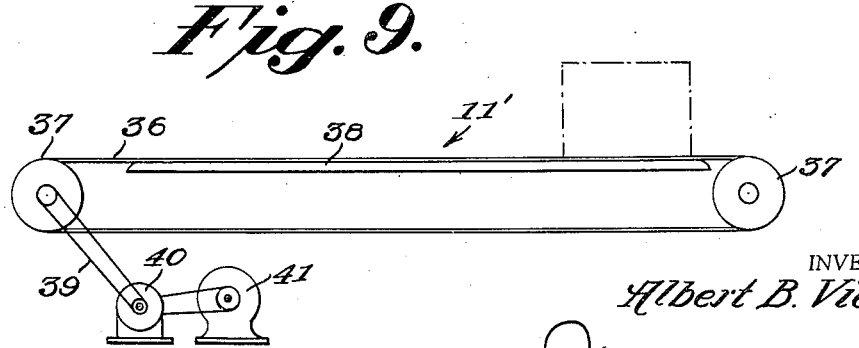
INVENTOR
Albert B. Vieth.
BY
ATTORNEY

United States Patent Office 2,819,805
Patented Jan. 14, 1958

2,819,805

BATTERY COMPONENT ASSEMBLING MACHINES

Albert B. Vieth, Hamburg, Pa., assignor to Price Battery Corporation, Hamburg, Pa., a corporation of Pennsylvania Application October 5, 1953, Serial No. 383,956

8 Claims. (Cl. 214—6)

This invention relates to a battery component assembling machine.

The invention is more particularly concerned with an improved machine for transporting in succession a negative battery plate, a rib-up separator plate, a positive plate, and a rib-down separator plate from respective stacks thereof disposed on a movable positioning assembly to an assembling and conveying assembly whereon successive stacks of plates in the said order are provided for introduction into batteries as units.

A principal object of the invention is to provide a battery component assembling machine which is highly compact in arrangement, durable in construction and efficient and dependable in operation.

A further and more specific object of the invention is to provide a battery component assembling machine which includes three cooperating assemblies whereby individual stacks of separator and positive and negative plates are automatically and successively brought into operative association with a suction head operable to transfer the plates in proper sequence to a stacking and conveying assembly.

Other objects and advantages of the invention will become apparent in the course of the following detailed description, taken in connection with the accompanying drawings, wherein:

Figure 3 is a vertical sectional view of the suction head assembly with the supporting frame thereof being broken away.

Figure 4 is a bottom plan view of the battery component engageable member.

Figure 5 is a broken top plan view of the component stacking and conveying assembly in one embodiment thereof.

Figure 6 is a broken side elevational view of the stacking and conveying assembly.

Figure 7 is a top plan view of the component feeding or positioning assembly.

Figure 8 is a view of the component positioning assembly, partly in elevation and partly in vertical section.

Figure 9 is a side elevational view of a modified form of stacking and conveying assembly.

Figure 2:
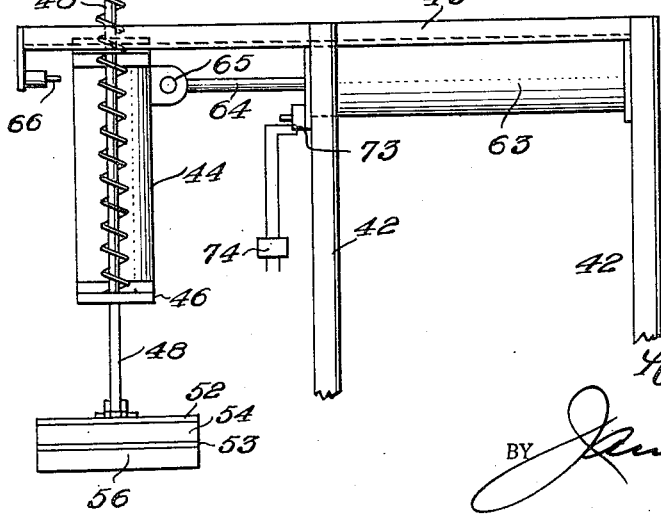
Figure 2 is a broken side elevational view of the suction head assembly embodied in the machine.

Referring now in detail to the drawings, it is to be observed that the improved machine comprises three different cooperating assemblies, namely, a battery component positioning assembly 10 (Figs. 7 and 8), a battery component stacking and conveying assembly 11 (Figs. 5 and 6), and a suction head assembly 12 (Figs. 2, 3 and 4) for transfer of groups of stacked plates from the component positioning assembly to the component stacking and conveying assembly.

These three cooperating assemblies will now be described in their above stated order except for the valves whose descriptions are being reserved for use in the final statement of the operation of the machine.

Referring now to Figs. 7 and 8, the component positioning assembly comprises a horizontal table 13 which is rotatably supported on a stub shaft 14 projecting upwardly from a base 15. The table is provided with a depending extension 16 to the lower end of which is secured a circular brake-engageable member 17 with which cooperates an electric brake 18.

The extension 16 is provided with an indexing ratchet 19 operable by a pawl 20 which has a vertical pivotal connection 21 with the outer end of a rod 22 whose inner end is connected to a piston (not shown) operatively disposed within a pneumatic cylinder 23 supported on brackets 24 and 25 projecting upwardly from the base 15.

The table 13 is provided on its upper face with right angularly disposed component retaining plates 26 which provide four rectangular seats for adjacent portions of negative and positive plates as well as separator plates which are arranged in vertical stacks and the several stacks of plates and separators are retained in said seats by vertically projecting pins 27 whose lower ends may extend through the table as shown in Fig. 8.

As is indicated by dot-and-dash lines in Fig. 7 the battery components include a vertical stack of separator plates (rib down), a vertical stack of negative plates, a vertical stack of separator plates (rib up), and a vertical stack of positive plates, considered in a clockwise direction in Fig. 7.

The stacking and conveying assembly 11 (Figs. 5 and 6) comprises a base member 28 on one end of which is supported a pneumatic cylinder 29 having a piston therein in well known manner and from which piston projects a rod 30 whose free end is rigidly connected to a stacking tray comprising a transverse base bar 31 from which project a plurality of teeth 32. The tray is longitudinally slidably disposed on opposite side flanges 33 projecting upwardly from the base 28 and longitudinal sliding movement is imparted to the tray by means of the piston-operated rod 30.

Figure 1:
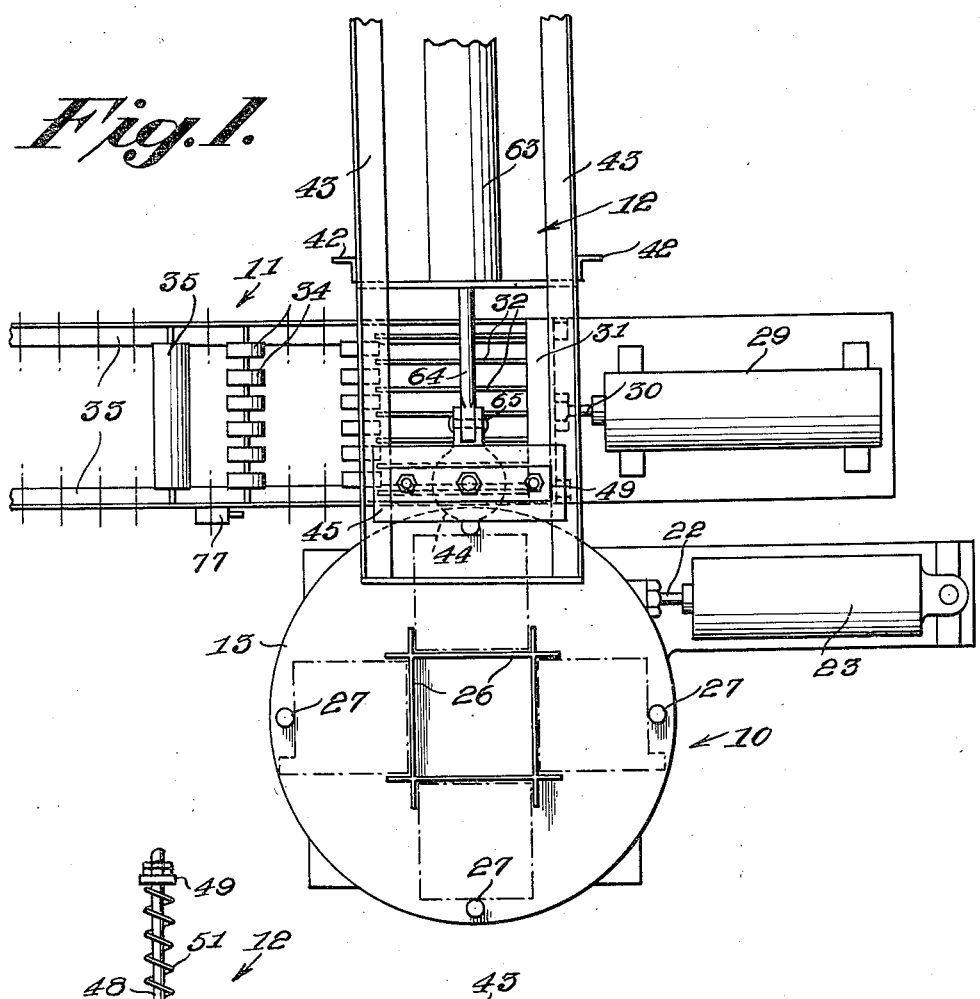
Figure 1 is a top plan view of the complete battery component assembling machine in accordance with a preferred structure embodiment thereof.

A conveyor is disposed on base 28 for reception of stacked battery components and same comprises a plurality of rollers including a series of necked rollers 34 adjacent the tray, and a further series of rollers 35 (Fig. 1) which are continuously cylindrical from end to end. The purpose of the necked rollers 34 is to permit the tray teeth 32 to enter between same for transfer of a stack of components from the tray to the conveyor.

A modified form of stacking and conveying assembly is illustrated in Fig. 9 which is of substantially simpler form and which in fact is a preferred embodiment. As indicated, the modified form of stacking and conveying assembly 11' comprises an endless belt 36 movable about a pair of spaced rollers 37, and a load-sustaining plate 38 is disposed beneath the upper run of the belt. One of the rollers 37 is driven by a belt 39 from a gear reduction unit 40 which in turn is driven by a suitable motor 41. The belt 36 is, of course, moved intermittently, it being at rest during a stacking operation and for which purpose suitable switch control means may be associated with the motor 41.

The suction head assembly 12 (Figs. 2, 3 and 4) comprises a supporting frame 42 including a pair of laterally opposed longitudinal guide bars 43.

A vertically disposed pneumatic cylinder 44 is rigidly supported between upper and lower plates 45 and 46, the former of which is provided with opposite edge grooves 47 in which the guide bars 43 are received whereby the cylinder 44, together with plates 45 and 46, are movable as a unit longitudinally of the guide bars 43. A pair of vertically disposed rods 48 extend loosely through apertures 45' and 46' in the plates 45 and 46, respectively, and a plate 49 is supported on the upper ends of rods 48 against upward movement by nuts 50.

A coil spring 51 encircles each rod 48, extends through a respective aperture 45' and has its opposite ends bearing on plates 46 and 49.

Secured to the lower ends of rods 48 is a component contacting member including an upper plate 52 and a lower plate 53 between which is disposed marginal spacers 54 providing an air chamber 55 between the plates 52 and 53. Disposed beneath the plate 53 and suitably secured thereto is a soft rubber component contacting and gripping pad 56. The pad 56 is provided with a central aperture 57 for a purpose later referred to. The pad is further provided with rectangularly arranged suction apertures 58 which communicate with the air chamber 55 through apertures 59 in the plate 53.

A piston 60 is disposed within the cylinder 44 and a rod 61 projects from the piston through the upper end of cylinder 44 and has its upper end secured to plate 49 by nuts 62.

It is to be observed that the cylinder 44 and attaching plates 45 and 46 are vertically fixed and that the rods 48, plate 49, component contacting member and piston 60 are vertically movable as a unit except for the yield of springs 51 upon engagement of the contacting member with a stack of components.

The suction head assembly further comprises a horizontal pneumatic cylinder 63 supported by frame 42 and which is provided with a piston rod 64 having its outer end pivotally connected to the vertical cylinder 44 as indicated at 65.

The purpose of cylinder 63 is to impart horizontal movement to the cylinder 44, plates 45, 46 and elements associated therewith.

Having described the general structure of the machine, the operation thereof is as follows:

When the suction head is down in its battery component pick-up position, the micro-switches 66 and 67 are closed, the suction valve 68 is open and the sensing valve 69 reverses the three-way valve 70 for reversing the action of piston 60 and moving the component-gripping member up.

If the component-engageable finger 71 opens switch 67 to signal that the head is not carrying a battery component, the three-way valve 70 is reversed to lower the head and repeat the foregoing operation, which will be repeated as often as required until the suction head is conveying a battery component.

The suction head continues its vertical movement until micro-switch 72 is closed and the head then moves in a horizontal direction until the micro-switch 73 is closed. The micro-switch 73 reverses the travel of the head from the horizontal to downward vertical movement over the tray 31—32, actuates the electronic counter 74 which actuates the three-way valve 75 to power the pneumatic cylinder 23 and the rotary table 13 until a pin 27 closes the micro-switch 76 which closes the circuit of the electric brake 18 and reverses the three-way valve 75 to return the piston in cylinder 23 to its retracted position.

The suction head continues its vertical movement until the battery component is deposited on the pile being stacked on the tray 31—32 actuating the sensing valve 69 which closes the suction valve 68 and reverses the direction of the travel of the head. The head continues its upward vertical movement until the micro-switch 72 is closed which changes the vertical movement to horizontal movement. The head continues in its horizontal movement until the micro-switch 66 is closed which changes the direction of movement from the horizontal to the downward vertical battery component supply stack on the plate.

The above enumerated operations are repeated until the electronic counter 74 has signaled that the required number of battery components has been stacked on the tray 31—32.

At this operational point the counter 74 does not actuate the three-way valve 75, but jumps over to the above described operation wherein the head moves vertically with a consequent operation of the micro-switch 72 and with a resulting actuation of the three-way solenoid valve 76 which actuates the pneumatic cylinder 29 to its extended position, shuttling the tray 31—32 to convey the stacked pile of battery components to the conveyor rollers 34, 35 or the belt 38.

When the micro-switch 77 is closed by contact with the tray 31—32 the three-way valve 76 is reversed to return the pneumatic cylinder 29 to its retracted or assembly position. When the micro-switch 78 is closed by contact with tray 31—32 the electronic circuit is closed to resume operation.

From the above detailed description of a preferred structural embodiment of the invention, it will be seen that a battery component assembling machine is provided which is compact in arrangement as well as efficient and dependable in operation.

Having described my invention in accordance with a preferred structural embodiment thereof, what I claim and desire to secure by U. S. Letters Patent is:

1. A battery component assembling machine comprising a horizontally movable member for supporting stacks of positive, negative, and separator plates, means for intermittently moving said member to position said stacks in succession at a single pick-up position, a component stacking and conveying means adjacent said member, and a means mounted for successive linear, vertical and horizontal movements operable to transfer individual components from a stack on said member to said stacking and conveying means, said component-stacking and conveying means comprising a stack-supporting tray, and a series of stack-conveying rollers transversely alined with the tray, said tray being supported for movement in a directional normal to the axes of said rollers, means cooperating with said tray for moving same, said tray comprising a base bar and a series of elongated parallel teeth projecting from one side of said bar, and certain of said rollers adjacent said tray being necked for receiving said teeth upon longitudinal movement of the tray.

2. A battery component assembling machine comprising a horizontally movable member for supporting stacks of positive, negative, and separator plates, means for intermittently moving said member to position said stacks in succession at a single pick-up position, a component stacking and conveying means adjacent said member, and a means mounted for successive linear, vertical, and horizontal movement operable to transfer individual components from a stack on said member to said stacking and conveying means, said second means comprising a suction head assembly including a vertically disposed pneumatic cylinder, means mounting said cylinder for horizontal movement, a horizontally disposed pneumatic cylinder having connection with said first cylinder for effecting longitudinal movement thereof, and vertically movable component-transporting means operable by said first cylinder, said component-transporting means comprising a piston in said first cylinder, a plate secured to each of the upper and lower ends of the cylinder, a pair of parallel vertically disposed rods movably supported by said plates, a plate supported by the upper ends of said rods, a suction head carried by the lower ends of said rods, and a piston rod connected to said last plate.

3. The structure according to claim 2, together with a coil spring surrounding each of said rods with its opposite ends bearing on the lowermost of said first plates and said last plate.

4. The structure according to claim 2, wherein said suction head comprises a rectangular member having an air chamber therein, and a soft rubber component-engageable pad secured to the lower face of said member.

5. A battery component assembling machine comprising a horizontally disposed rotatably mounted member for supporting stacks of positive, negative, and separator plates, means for intermittently rotating said member for positioning said stacks in succession at a pick-up position, an intermittently linearly movable component-stacking and conveying means adjacent said member, and means disposed adjacent said member of said first means including a frame, a plate-contacting and transfer suction member supported by the frame, pneumatically operable means supported by the frame operatively connected with said plate-contacting and transfer member for moving same vertically upwardly from said stack-supporting member, thence horizontally to a position above said stacking and conveying means, thence vertically downwardly to a position adjacent said stacking and conveying means, and vice versa, and synchronized control means for effecting all of said movements, said rotatably mounted member comprising a circular table, a horizontal base member beneath said table, a stub shaft projecting vertically upwardly from said base member, a cylindrical extension depending from the center of said table and rotatably supported on said shaft, an indexing ratchet supported on said extension, a circular brake-engageable member secured to said extension adjacent said base member, and a pneumatically operable pawl engageable with said ratchet for moving said table intermittently through 90° angular ranges, said table being provided adjacent its center with four vertical rectangular seats in right angular relation for receiving the adjacent inner portions of stacks of battery components, and four vertically extending pins secured to the table adjacent its perimeter for retaining said stacks of components within said seats, the axis of each of said pins and the axis of said table being in a plane bisecting the base of a corresponding seat.

6. A battery component assembling machine comprising a horizontally disposed rotatably mounted member for supporting stacks of positive, negative, and separator plates, means for intermittently rotating said member for positioning said stacks in succession at a pick-up position, an intermittently linearly movable component stacking and conveying means adjacent said member, and means disposed adjacent said member of said first means including a frame, a plate-contacting and transfer suction member supported by the frame, pneumatically operable means supported by the frame operatively connected with said plate-contacting and transfer member for moving same vertically upwardly from said stack-supporting member, thence horizontally to a position above said stacking and conveying means, thence vertically downwardly to a position adjacent said stacking and conveying means, and vice versa, and synchronized control means for effecting all of said movements, said component stacking and conveying means comprising a base member, opposed flanges projecting upwardly from said base member, a plate-receiving and stack-supporting tray slidably supported on said flanges, said tray comprising a horizontal base bar and a series of elongated parallel and laterally spaced teeth projecting horizontally from one side of the bar, and a stack roller conveyor horizontally alined with said tray and including necked rollers adjacent said tray for receiving said teeth upon longitudinal movement of the tray.

7. A battery component assembling machine comprising a battery plate positioning assembly, a battery plate stacking and conveying assembly and means for transferring groups of plates from said positioning assembly to said stacking and conveying assembly, said positioning assembly comprising a table rotatable about a vertical axis, said table being provided adjacent its center with four vertical rectangular seats in right angular relation for receiving the adjacent inner portions of stacks of battery plates, and four vertically extending pins secured to the table adjacent its perimeter for retaining said stacks of plates within said seats, the axis of each of said pins and the axis of said table being in a plane bisecting the base of a corresponding seat.

8. A battery component assembling machine comprising a battery plate positioning assembly, a battery plate stacking and conveying assembly and means for transferring groups of plates from said positioning assembly to said stacking and conveying assembly comprising a base member, opposed flanges projecting upwardly from said base member, a plate-receiving and stack-supporting tray slidably supported on said flanges, said tray comprising a horizontal base bar and a series of elongated parallel and laterally spaced teeth projecting horizontally from one side of the bar, and a stack roller conveyor horizontally alined with said tray and including necked rollers adjacent said tray for receiving said teeth upon longitudinal movement of the tray.

References Cited in the file of this patent

UNITED STATES PATENTS

| Number | Name | Date |
| --- | --- | --- |
| 738,114 | Lentz | Sept. 1, 1903 |
| 1,336,304 | Leumann | Apr. 6, 1920 |
| 1,532,255 | Miller | Apr. 7, 1925 |
| 1,575,185 | Stenhouse | Mar. 2, 1926 |
| 1,671,534 | Lockhart | May 29, 1928 |
| 1,749,620 | Winslow | Mar. 4, 1930 |
| 1,836,444 | Carnahan | Dec. 15, 1931 |
| 2,062,732 | Scull | Dec. 1, 1936 |
| 2,587,959 | Biner | Mar. 4, 1952 |
| 2,623,773 | Melzer | Dec. 30, 1952 |
| 2,644,309 | Detrez | July 7, 1953 |
| 2,665,013 | Socke et al. | Jan. 5, 1954 |
| 2,677,471 | Skinner | May 4, 1954 |
| 2,704,593 | Galloway | Mar. 22, 1955 |